(12) United States Patent
Chaudhari et al.

(10) Patent No.: US 10,513,944 B2
(45) Date of Patent: Dec. 24, 2019

(54) MANIFOLD FOR USE IN A CLEARANCE CONTROL SYSTEM AND METHOD OF MANUFACTURING

(71) Applicant: General Electric Company, Schenectady, NY (US)

(72) Inventors: Vinod Shashikant Chaudhari, Karnataka (IN); Neil Fraser Cunningham, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 283 days.

(21) Appl. No.: 14/976,059

(22) Filed: Dec. 21, 2015

(65) Prior Publication Data

US 2017/0175563 A1 Jun. 22, 2017

(51) Int. Cl.
*F01D 11/24* (2006.01)

(52) U.S. Cl.
CPC .......... *F01D 11/24* (2013.01); *F05D 2230/30* (2013.01); *F05D 2260/201* (2013.01); *Y02T 50/671* (2013.01); *Y02T 50/675* (2013.01)

(58) Field of Classification Search
CPC ..................................................... F01D 11/24
See application file for complete search history.

(56) References Cited

U.S. PATENT DOCUMENTS

| | | | |
|---|---|---|---|
| 5,205,708 A | 4/1993 | Plemmons et al. | |
| 6,896,038 B2 * | 5/2005 | Arilla | F01D 11/24 165/47 |
| 7,114,914 B2 * | 10/2006 | Gendraud | F01D 11/24 415/108 |
| 7,309,209 B2 * | 12/2007 | Amiot | F01D 11/24 415/136 |
| 7,597,537 B2 | 10/2009 | Bucaro et al. | |
| 8,126,628 B2 | 2/2012 | Hershey et al. | |
| 8,414,255 B2 * | 4/2013 | Ireland | F01D 5/187 415/116 |
| 9,109,608 B2 | 8/2015 | Little et al. | |
| 2014/0030066 A1 | 1/2014 | Schimmels et al. | |

(Continued)

FOREIGN PATENT DOCUMENTS

| GB | 2 217 788 A | 11/1989 |
|---|---|---|
| WO | 2015112384 A1 | 7/2015 |

OTHER PUBLICATIONS

Extended European Search Report and Opinion issued in connection with corresponding EP Application No. 16203217.1 dated Jul. 25, 2017.

(Continued)

*Primary Examiner* — Justin D Seabe
(74) *Attorney, Agent, or Firm* — General Electric; James Reed (57) ABSTRACT

A manifold for use in a clearance control system is provided. The clearance control system includes a housing including a plurality of walls that at least partially define an interior of the housing, and a nozzle portion integrally formed with the housing. The nozzle portion extends between adjacent walls of the plurality of walls and including at least one nozzle projection having a plurality of impingement openings defined therethrough. The at least one nozzle projection extends from the adjacent walls in an outward direction relative to the interior of the housing.

16 Claims, 11 Drawing Sheets

(56) References Cited

U.S. PATENT DOCUMENTS

| | | | |
|---|---|---|---|
| 2014/0064913 A1* | 3/2014 | Adavikolanu | F01D 11/24 |
| | | | 415/1 |
| 2014/0248115 A1 | 9/2014 | Blaney et al. | |
| 2016/0169026 A1* | 6/2016 | Jones | F01D 11/24 |
| | | | 415/1 |

OTHER PUBLICATIONS

Canadian Office Action issued in connection with corresponding CA Application No. 2951112 dated Dec. 1, 2017.
Machine translation and Chinese Office Action issued in connection with corresponding CN Application No. 201611191753.0 dated Apr. 28, 2018.

* cited by examiner

MANIFOLD FOR USE IN A CLEARANCE CONTROL SYSTEM AND METHOD OF MANUFACTURING

BACKGROUND

The present disclosure relates generally to a clearance control system for use in aerospace applications and, more specifically, to a manifold for use in the clearance control system.

At least some known gas turbine engines, such as aircraft engines, include an engine casing that extends circumferentially about a compressor and a turbine that each include a rotor assembly and a stator assembly. Known rotor assemblies include at least one row of rotating blades that extend radially outward from a blade root coupled to the rotor assembly, to a blade tip that passes proximate the stator assembly. A radial tip clearance is defined between the rotating blade tips and a stationary shroud attached to the engine casing.

In these known assemblies, during engine operation, variations in the thermal environment in the engine may cause thermal expansion or contraction of the rotor and stator assemblies. Such thermal expansion or contraction may not occur uniformly in magnitude or rate. As a result, inadvertent rubbing, such as between the rotor blade tips and the shroud may occur. Moreover, radial clearances may be created that are wider than acceptable the design clearances. These wider clearances may adversely affect engine performance. Continued rubbing between the rotor blade tips and engine casing may lead to premature failure of the rotor blade.

At least some known aircraft engines use active clearance control systems to control the thermal expansion or contraction of the engine casing. For example, at least some known active clearance control systems discharge a flow of air from the compressor, or other suitable fluid sources, towards the engine casing. In some embodiments, the flow of air is discharged from a manifold extending circumferentially about the engine casing. The manifold is typically manufactured from sheet metal, and is formed in a roll forming process. However, the thickness of the sheet metal and the process used to form the manifold generally limits the final shape of the manifold. Moreover, the thickness of the sheet metal is typically limited to reduce the weight of the aircraft engine.

BRIEF DESCRIPTION

In one aspect, a manifold for use in a clearance control system is provided. The manifold includes a housing including a plurality of walls that at least partially define an interior of the housing, and a nozzle portion integrally formed with the housing. The nozzle portion extends between adjacent walls of the plurality of walls and including at least one nozzle projection having a plurality of impingement openings defined therein. The at least one nozzle projection extends from the adjacent walls in an outward direction relative to the interior of the housing.

In another aspect, a gas turbine engine is provided. The gas turbine engine includes a fluid source, and a manifold configured to receive a flow of air from the fluid source. The manifold includes a housing including a plurality of walls that at least partially define an interior of the housing, and a nozzle portion integrally formed with the housing. The nozzle portion extends between adjacent walls of the plurality of walls and includes at least one nozzle projection having a plurality of impingement openings defined therein. The at least one nozzle projection extends from the adjacent walls in an outward direction relative to the interior of the housing.

In yet another aspect, a method of manufacturing a manifold for use in a clearance control system is provided. The method includes providing a housing that includes a plurality of walls that at least partially define an interior of the housing, and integrally forming a nozzle portion with the housing. The nozzle portion extends between adjacent walls of the plurality of walls and includes at least one nozzle projection having a plurality of impingement openings defined therein. The at least one nozzle projection extends from the adjacent walls in an outward direction relative to the interior of the housing.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Embodiments of the present disclosure relate to turbine engines, such as turbofans, and methods of manufacturing thereof. More specifically, the turbine engines described herein include an active clearance control system including at least one manifold for channeling a flow of air towards a casing of the turbine engine. The manifold includes a housing and a nozzle portion formed separately from and subsequently integrally formed with the housing. The nozzle portion includes at least one nozzle projection that facilitates at least one of reducing a distance between the nozzle projection and the casing and/or increasing the Venturi effect of the nozzle portion to increase the cooling efficiency of the flow of air channeled towards the casing. Moreover, the nozzle portion is formed separately from the housing using an additive manufacturing technique, for example, to ensure the complex shape of the nozzle projection can be achieved without increasing the overall thickness and weight of the manifold.

Figure 1:
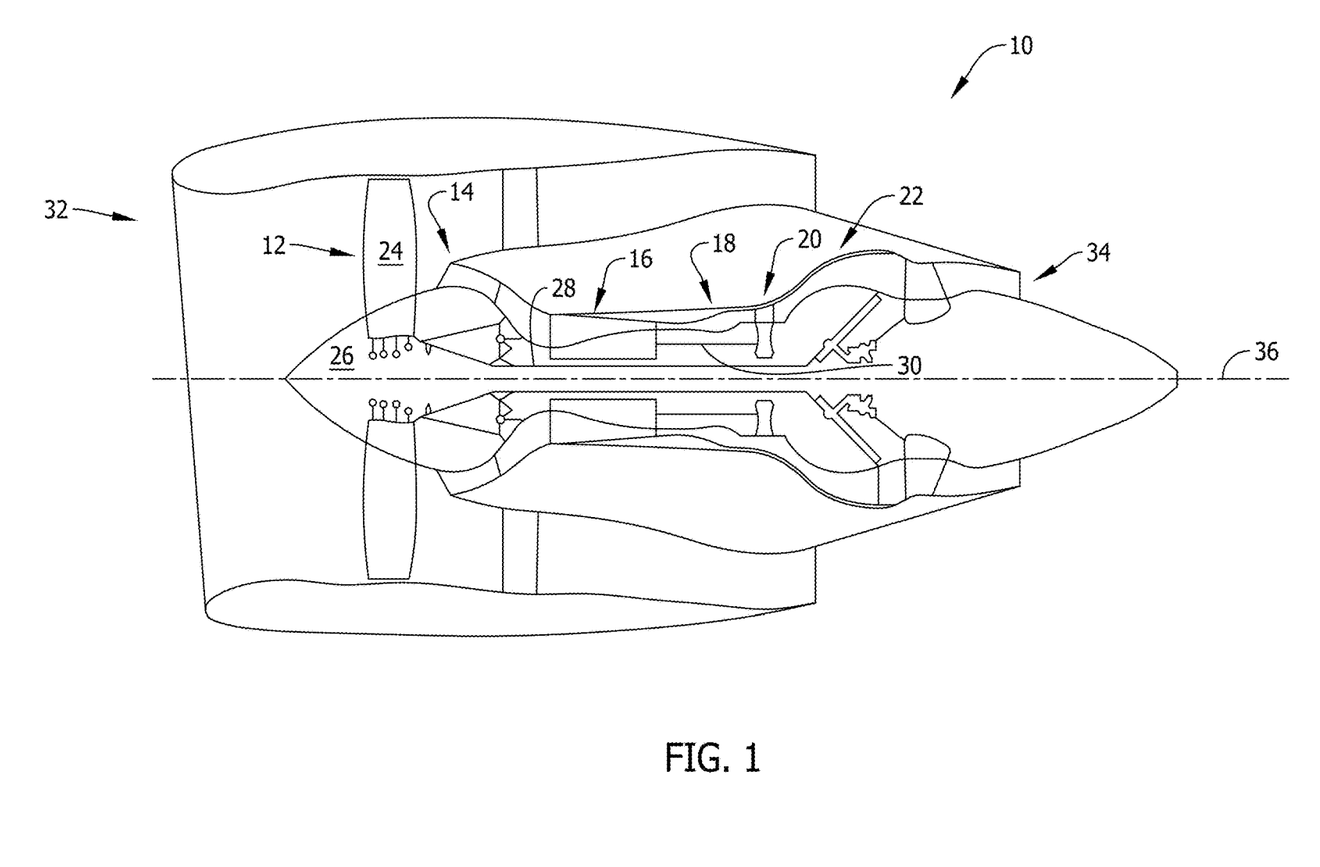
FIG. 1 is a schematic illustration of an exemplary turbofan engine.

FIG. 1 is a schematic illustration of an exemplary turbofan engine 10 including a fan assembly 12, a low pressure or booster compressor 14, a high-pressure compressor 16, and a combustor assembly 18. Fan assembly 12, booster compressor 14, high-pressure compressor 16, and combustor assembly 18 are coupled in flow communication. Turbofan engine 10 also includes a high-pressure turbine 20 coupled in flow communication with combustor assembly 18 and a low-pressure turbine 22. Fan assembly 12 includes an array of fan blades 24 extending radially outward from a rotor disk 26. Low-pressure turbine 22 is coupled to fan assembly 12 and booster compressor 14 through a first drive shaft 28, and high-pressure turbine 20 is coupled to high-pressure compressor 16 through a second drive shaft 30. Turbofan engine 10 has an intake 32 and an exhaust 34. Turbofan engine 10 further includes a centerline 36 about which fan assembly 12, booster compressor 14, high-pressure compressor 16, and turbines 20 and 22 rotate.

In operation, air entering turbofan engine 10 through intake 32 is channeled through fan assembly 12 towards booster compressor 14. Compressed air is discharged from booster compressor 14 towards high-pressure compressor 16. Highly compressed air is channeled from high-pressure compressor 16 towards combustor assembly 18, mixed with fuel, and the mixture is combusted within combustor assembly 18. High temperature combustion gas generated by combustor assembly 18 is channeled towards turbine assemblies 20 and 22. Combustion gas is subsequently discharged from turbofan engine 10 via exhaust 34.

Figure 2:
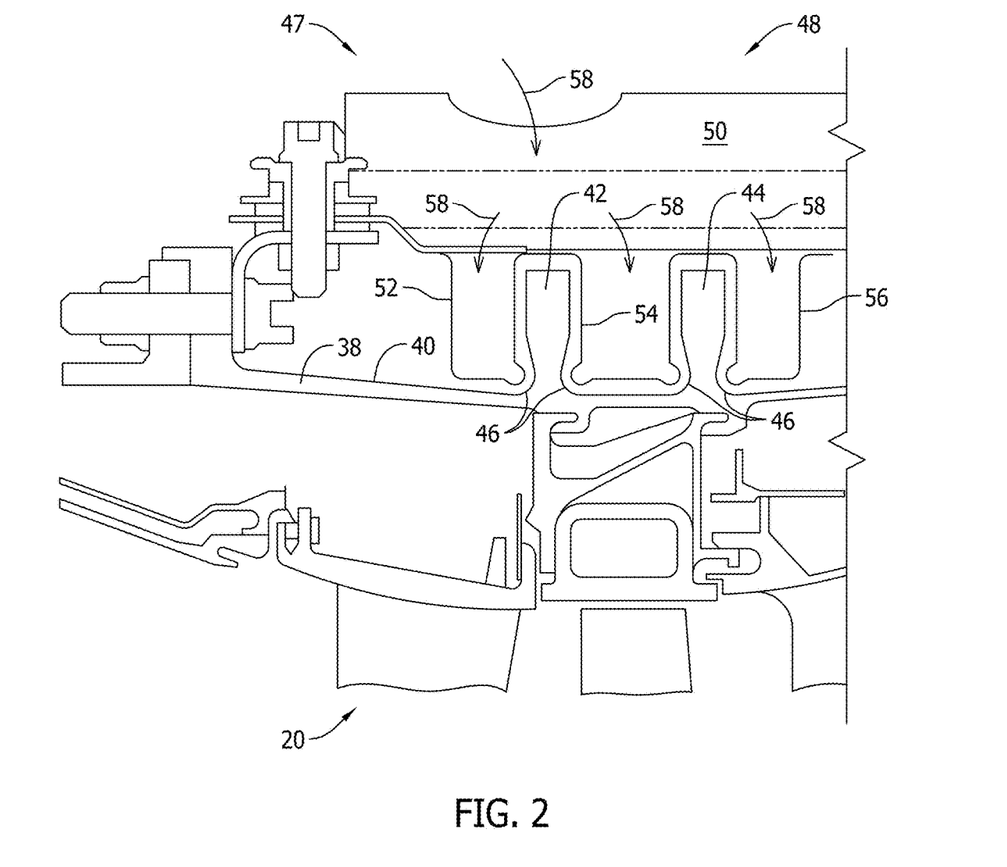
FIG. 2 is a cross-sectional view of a portion of the turbofan engine shown in FIG. 1.

FIG. 2 is a cross-sectional view of a portion of turbofan engine 10 (shown in FIG. 1). In the exemplary embodiment, turbofan engine 10 includes a casing 38 positioned radially outward from high-pressure turbine 20. Casing 38 includes an outer surface 40 and a first radial member 42 and a second radial member 44 extending from outer surface 40. In one embodiment, first radial member 42 and second radial member 44 are embodied as thermal control rings that extend radially outward from outer surface 40. Moreover, a filleted region 46 is defined between outer surface 40 and each of first radial member 42 and second radial member 44.

Turbofan engine 10 also includes a clearance control system 47 including a manifold assembly 48 positioned radially outward from casing 38. In the exemplary embodiment, manifold assembly 48 includes a distribution header 50 and a first manifold 52, a second manifold 54, and a third manifold 56 in flow communication with distribution header 50. In operation, distribution header 50 receives a flow of air 58 from a fluid source such as, but not limited to, fan assembly 12, booster compressor 14 (each shown in FIG. 1), or any other suitable source. As such, each manifold 52, 54, and 56 in manifold assembly 48 receives the flow of air 58 from the fluid source for channeling the flow of air 58 towards casing 38. In an alternative embodiment, casing 38 and manifold assembly 48 are positioned radially outward from low-pressure turbine 22 (shown in FIG. 1).

Figure 3:
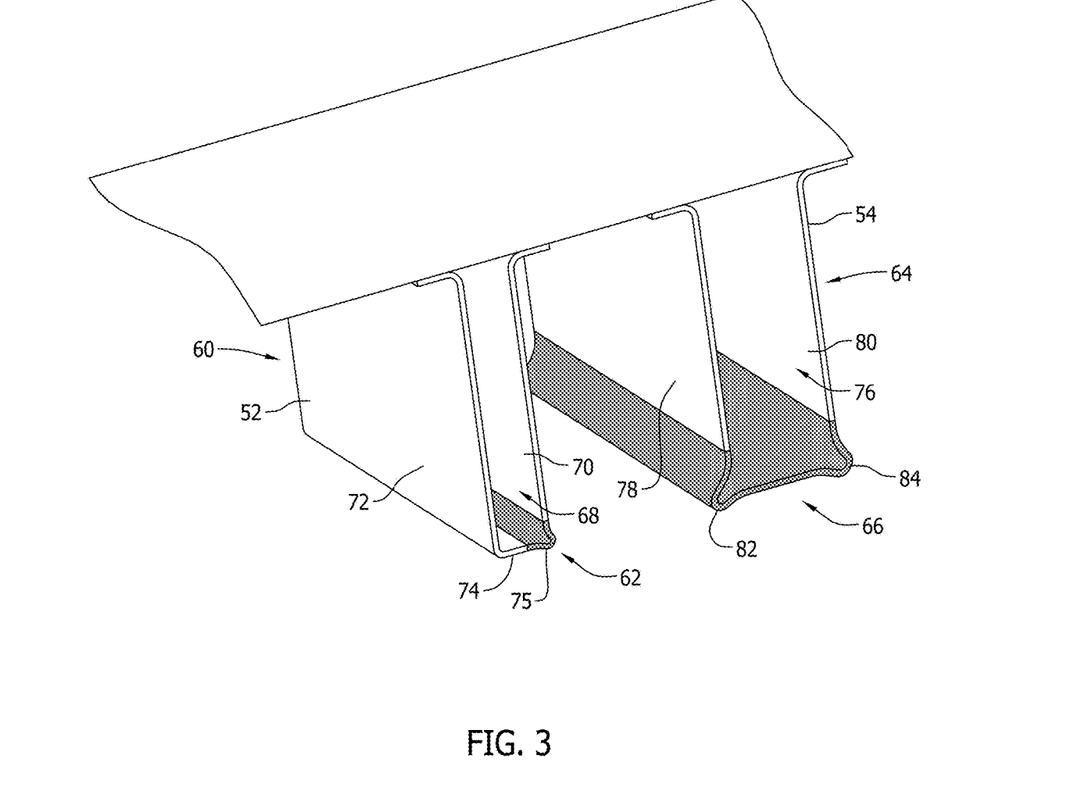
FIG. 3 is a perspective sectional view of a portion of an exemplary manifold assembly that may be used with the clearance control system shown in FIG. 2.

FIG. 3 is a perspective sectional view of a portion of manifold assembly 48 that may be used with clearance control system 47 (shown in FIG. 2). In the exemplary embodiment, first manifold 52 and second manifold 54 each include a housing and a nozzle portion integrally formed with the housing. More specifically, first manifold 52 includes a first housing 60 and a first nozzle portion 62 integrally formed with first housing 60, and second manifold 54 includes a second housing 64 and a second nozzle portion 66 integrally formed with second housing 64. First housing 60 includes a plurality of walls that at least partially define an interior 68 of first housing 60. More specifically, the plurality of walls includes a first wall 70, a second wall 72, and a third wall 74 extending between first wall 70 and second wall 72. As will be described in more detail below, the nozzle portion of first and second manifolds 52 and 54 extends between adjacent walls of the plurality of walls and includes at least one nozzle projection 75 having a plurality of impingement openings (not shown in FIG. 3) defined therein. In the exemplary embodiment, first nozzle portion 62 extends between first wall 70 and third wall 74.

Second housing 64 includes a plurality of walls that at least partially define an interior 76 of second housing 64. More specifically, the plurality of walls includes a first wall 78 and a second wall 80 extending substantially parallel with each other. Second nozzle portion 66 extends between first wall 78 and second wall 80. Second nozzle portion 66 differs from first nozzle portion 62 in that second nozzle portion 66 includes more than one nozzle projection. More specifically, second nozzle portion 66 includes a first nozzle projection 82 and a second nozzle projection 84 formed at adjacent ends of second nozzle portion 66. As such, second manifold 54 is capable of channeling a flow of air 58 towards adjacent filleted regions 46 of casing 38 when positioned between first radial member 42 and second radial member 44 (all shown in FIG. 2).

Moreover, first manifold 52, second manifold 54, and third manifold 56 (shown in FIG. 2) each have an arcuate shape to enable manifold assembly to extend circumferentially about casing 38 (shown in FIG. 2). In one embodiment, each manifold 52, 54, and 56 is formed from a plurality of manifold segments each having an arcuate shape. Separating first, second, and third manifolds 52, 54, and 56 into a plurality of manifold segments facilitates accounting for differences in thermal expansion therebetween during operation of turbofan engine 10.

Figure 4:
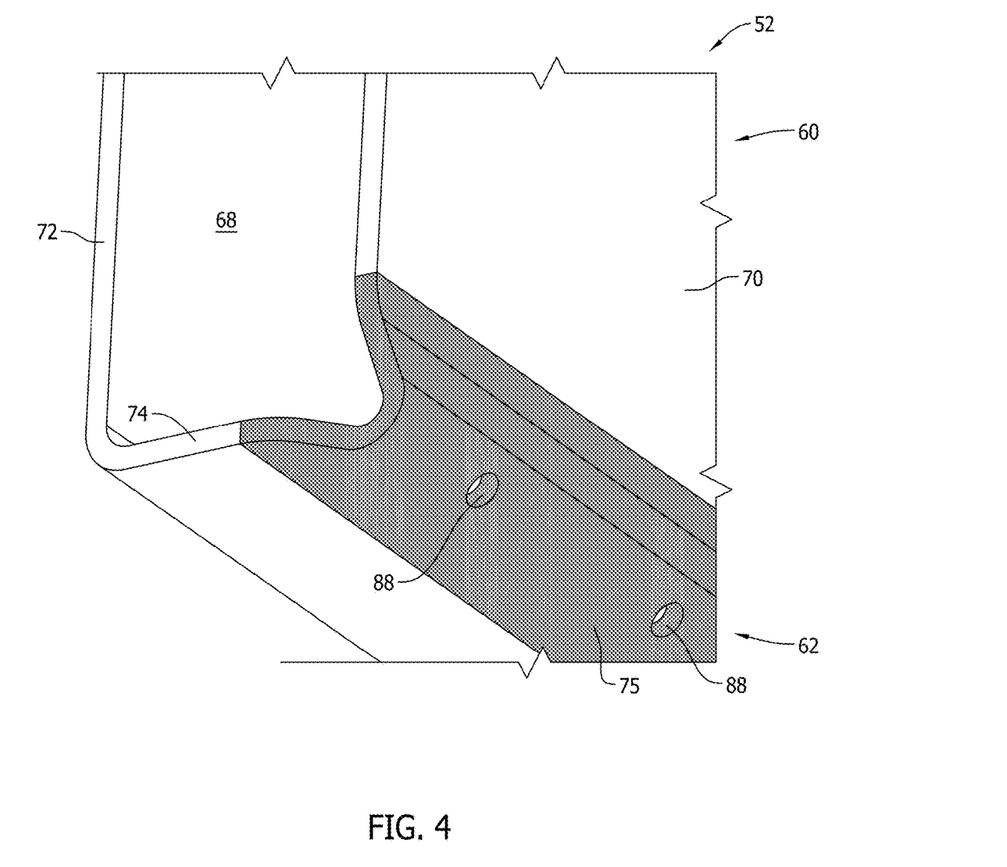
FIG. 4 is an enlarged perspective view of a first manifold that may be used in the manifold assembly shown in FIG. 3.
Figure 5:
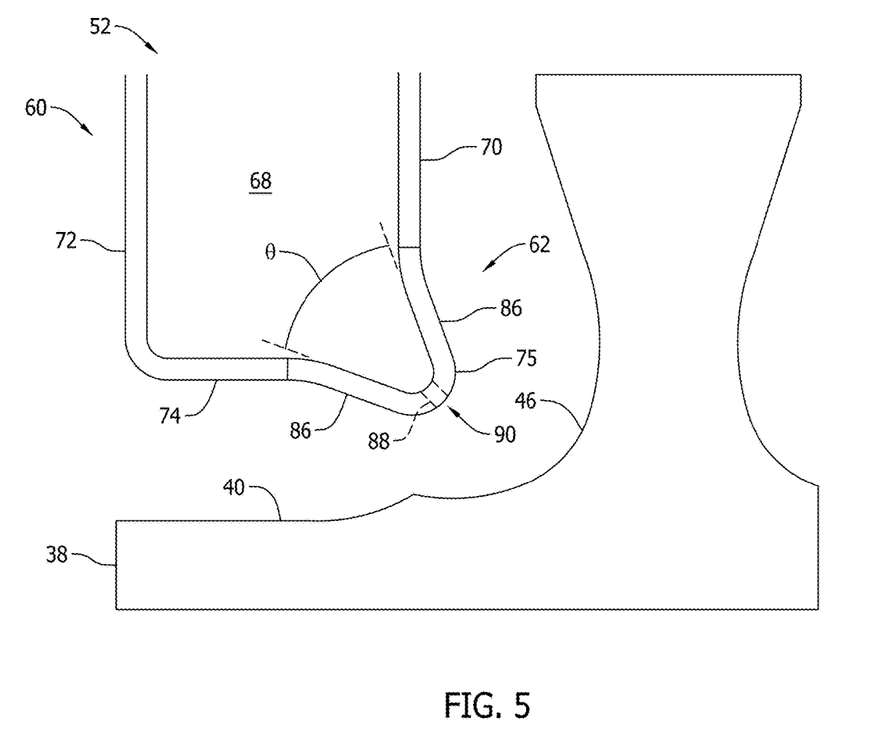
FIG. 5 is a cross-sectional view of a portion of the clearance control system shown in FIG. 2, in accordance with a first embodiment of the disclosure.

FIG. 4 is an enlarged perspective view of first manifold 52 that may be used in manifold assembly 48 (shown in FIG. 3), and FIG. 5 is a cross-sectional view of a portion of clearance control system 47 (shown in FIG. 2), in accordance with a first embodiment of the disclosure. In the exemplary embodiment, portions of first wall 70 and third wall 74 (i.e., adjacent walls) are removed prior to integrally forming first nozzle portion 62 with first housing 60, and first nozzle portion 62 is coupled to first wall and third wall 74 to cover the space once occupied by the removed portions. More specifically, first nozzle portion 62 extends between first wall 70 and third wall 74 and includes at least one nozzle projection 75 having a plurality of impingement openings 88 defined therein. Nozzle projection 75 is formed from a pair of converging walls 86 having an angle θ of less than about 90° defined therebetween. As such, converging walls 86 enable nozzle projection 75 to extend from the adjacent walls in an outward direction relative to interior 68 of first housing 60 to reduce a distance between an outlet 90 of impingement openings 88 and filleted region 46 of casing 38.

In the exemplary embodiment, first nozzle portion 62 is formed separately from and subsequently integrally formed with first housing 60. As used herein, "integrally formed" refers to forming separate components or features of an apparatus into a single unitary structure. For example, first nozzle portion 62 and first housing 60 may be cast as a single unitary structure, or first nozzle portion 62 may be either brazed or welded to first housing 60. Moreover, in one embodiment, first nozzle portion 62 is formed using an additive manufacturing technique to ensure the desired shape of first nozzle portion 62 can be achieved. An exemplary additive manufacturing technique includes, but is not limited to, a laser sintering process. In an alternative embodiment, first nozzle portion 62 is manufactured using conventional sheet metal having a thickness greater than first, second, or third walls 70, 72, or 74 to facilitate creating a desired nozzle effect.

Figure 6:
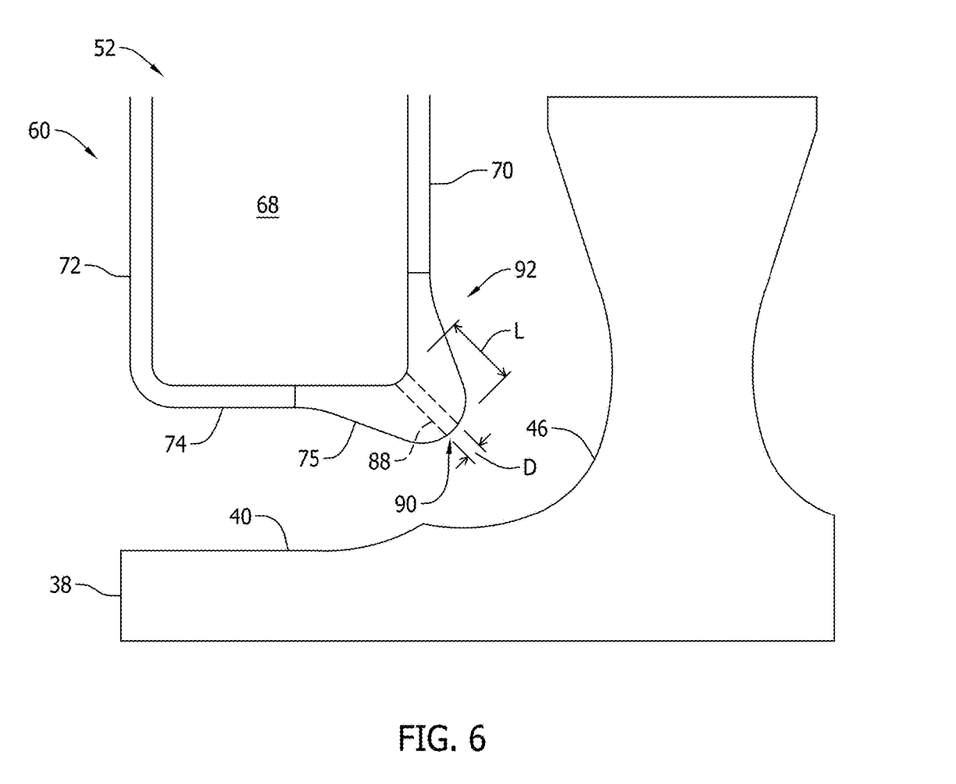
FIG. 6 is a cross-sectional view of a portion of the clearance control system shown in FIG. 2, in accordance with a second embodiment of the disclosure.

FIG. 6 is a cross-sectional view of a portion of clearance control system 47 (shown in FIG. 2), in accordance with a second embodiment of the disclosure. In the exemplary embodiment, nozzle projection 75 of a first nozzle portion 92 has a thickness such that a length (L)-to-diameter (D) ratio of the plurality of impingement openings 88 is greater than about 1:1. More specifically, nozzle projection 75 is thicker than first wall 70 and second wall 72. Increasing the thickness of nozzle projection 75 facilitates reducing the distance between outlet 90 of impingement openings 88 and filleted region 46, as well as improving the Venturi effect of impingement openings 88.

Figure 7:
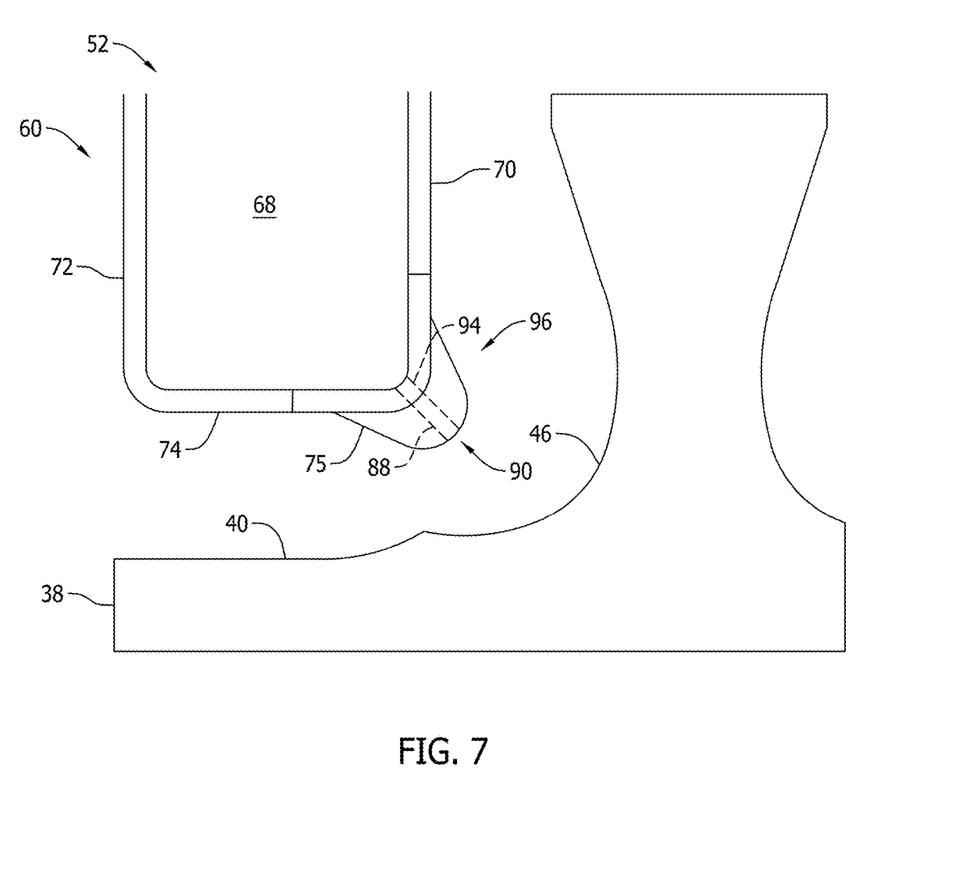
FIG. 7 is a cross-sectional view of a portion of the clearance control system shown in FIG. 2, in accordance with a third embodiment of the disclosure.

FIG. 7 is a cross-sectional view of a portion of clearance control system 47 (shown in FIG. 2), in accordance with a third embodiment of the disclosure. In the exemplary embodiment, first housing 60 includes a plurality of openings 94 defined in at least one wall of the plurality of walls. More specifically, instead of removing portions of first wall 70 and third wall 74, as shown in the first and second embodiments of the disclosure, a first nozzle portion 96 is coupled to first housing 60 and oriented such that the plurality of impingement openings 88 and the plurality of openings 94 substantially align. As such, the distance between nozzle projection 75 and filleted region 46 is decreased, and the Venturi effect of impingement openings 88 is improved without having to remove portions of first wall 70 and third wall 74.

Figure 8:
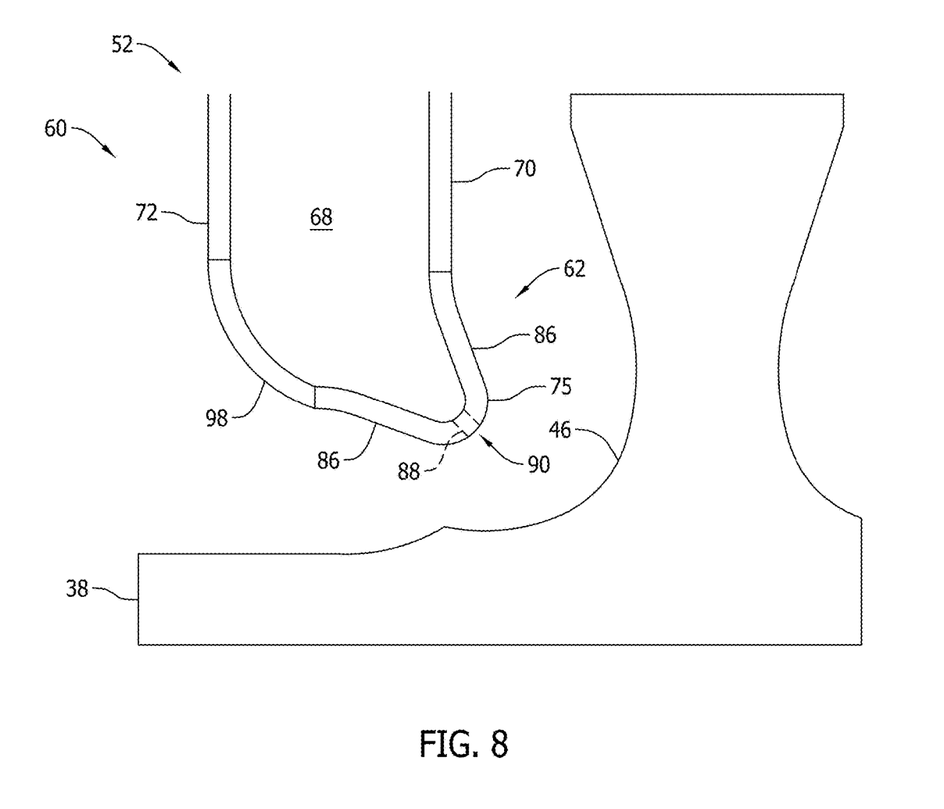
FIG. 8 is a cross-sectional view of a portion of the clearance control system shown in FIG. 2, in accordance with a fourth embodiment of the disclosure.

FIG. 8 is a cross-sectional view of a portion of clearance control system 47 (shown in FIG. 2), in accordance with a fourth embodiment of the disclosure. In the exemplary embodiment, first housing 60 includes a curved wall 98 coupled between first nozzle portion 62 and second wall 72. Curved wall 98 has a swept configuration that facilitates smoothly directing air from within interior 68 towards first nozzle portion 62.

Figure 9:
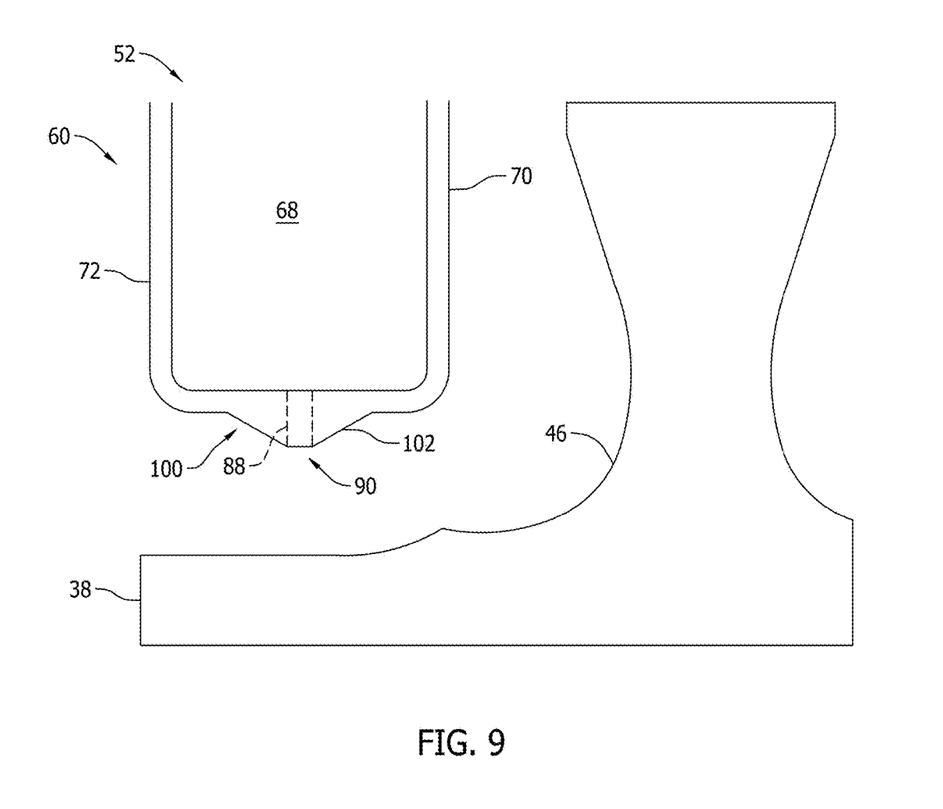
FIG. 9 is a cross-sectional view of a portion of the clearance control system shown in FIG. 2, in accordance with a fifth embodiment of the disclosure.

FIG. 9 is a cross-sectional view of a portion of the clearance control system 47 (shown in FIG. 2), in accordance with a fifth embodiment of the disclosure. In the exemplary embodiment, portions of first wall 70 and second wall 72 are removed prior to integrally forming a first nozzle portion 100 with first housing 60, and first nozzle portion 100 is coupled to first wall 70 and second wall 72 to cover the space once occupied by the removed portions. More specifically, first nozzle portion 100 extends between first wall 70 and second wall 72 and includes at least one nozzle projection 102 having a plurality of impingement openings 88 defined therein. Nozzle projection 102 is positioned such that air discharged from impingement openings 88 is directed towards a portion of casing 38 other than filleted region 46.

Figure 10:
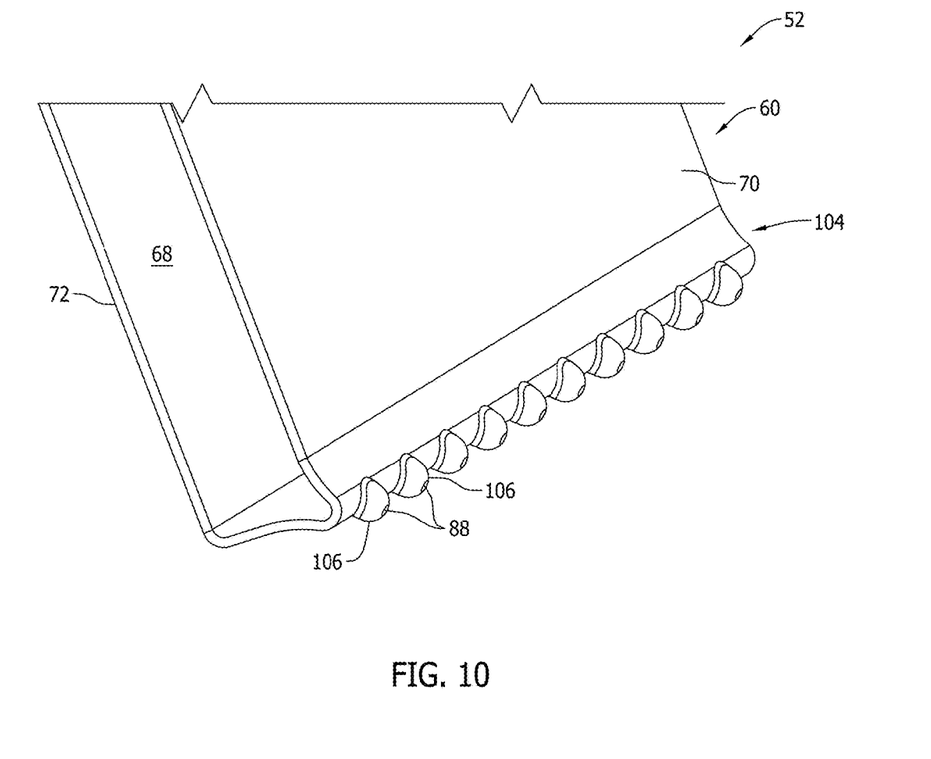
FIG. 10 is an enlarged perspective view of a first manifold that may be used in the manifold assembly shown in FIG. 3, in accordance with a sixth embodiment of the disclosure.
Figure 11:
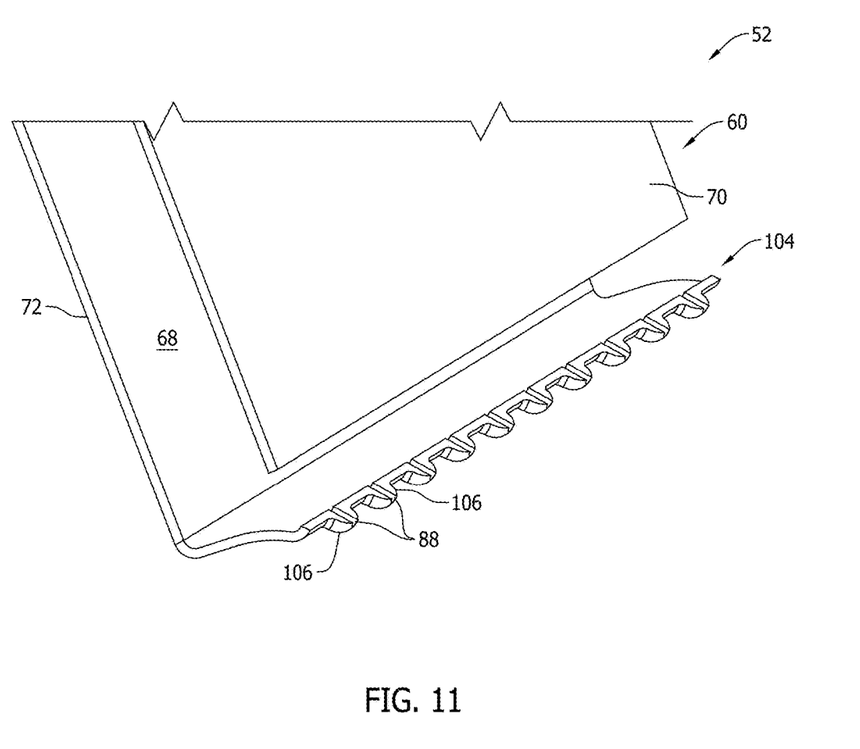
FIG. 11 is a partial cutaway view of the first manifold shown in FIG. 10.

FIG. 10 is an enlarged perspective view of first manifold 52 that may be used in manifold assembly 48 (shown in FIG. 3), in accordance with a sixth embodiment of the disclosure, and FIG. 11 is a partial cutaway view of the portion of first manifold 52. In the exemplary embodiment, a first nozzle portion 104 includes a plurality of nodules 106 extending from and integrally formed with first nozzle portion 104. The plurality of nodules 106 provide a localized increased thickness to facilitate improving the Venturi effect of impingement openings 88. Moreover, the localized increased thickness facilitates reducing the weight of first manifold 52.

An exemplary technical effect of the system and methods described herein includes at least one of: (a) reducing a distance between an outlet of an impingement opening of a nozzle and an engine casing; (b) increasing the Venturi effect of the nozzle; and (c) improving the cooling efficiency of a flow of air channeled towards the engine casing.

Exemplary embodiments of a turbofan engine and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with only turbofan engines and related methods as described herein. Rather, the exemplary embodiment can be implemented and utilized in connection with many applications where channeling fluid towards an object is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A manifold for use in a clearance control system, the manifold comprising:
    a housing comprising a plurality of walls, wherein the plurality of walls include a first wall having a first surface defining a first plane, a second wall having a second surface defining a second plane, the first and second walls extending substantially parallel with each other, and a third wall having a third surface defining a third plane, the third wall interconnecting and extending substantially perpendicular to the first and second walls, wherein the first, second, and third walls at least partially define an interior of the housing, a portion of the interior being disposed between the first and second walls; and
    a nozzle portion integrally formed with the housing, the nozzle portion extending between the third wall and one of the first and second walls and comprising at least one nozzle projection having a plurality of impingement openings defined therethrough, wherein the at least one nozzle projection extends from the third wall and one of first and second walls in an outward direction relative to the interior of the housing and beyond the third plane and at least one of the first and second planes.

2. The manifold in accordance with claim 1, wherein the nozzle portion is formed separately from and subsequently integrally formed with the housing.

3. The manifold in accordance with claim 1, wherein at least one nozzle projection has a thickness such that a length-to-diameter ratio of the plurality of impingement openings is greater than 1:1.

4. A gas turbine engine comprising:
    a distribution header configured to receive a flow of air from a fluid source;
    a manifold in fluid communication with the distribution header, the manifold including:
        a housing comprising a first wall having a first surface defining a first plane, a second wall having a second surface defining a second plane, the first and second walls extending substantially parallel with each other, and a third wall having a third surface defining a third plane, the third wall interconnecting and extending substantially perpendicular to the first and second walls, together the first, second and third walls defining an interior of the housing, the interior being disposed between the first and second walls; and
        a nozzle portion integrally formed with the housing, the nozzle portion extending between the third wall and one of the first and second walls and comprising at least one nozzle projection having a plurality of impingement openings defined therethrough, wherein the at least one nozzle projection extends from the third wall and one of first and second walls in an outward direction relative to the interior of the housing and beyond at least one of the first, second, and third planes.

5. The gas turbine engine in accordance with claim 4, wherein the manifold has an arcuate shape.

6. The gas turbine engine in accordance with claim 4, wherein the manifold is formed from a plurality of manifold segments each having an arcuate shape.

7. The gas turbine engine in accordance with claim 4 further comprising a casing that comprises an outer surface and a radial member extending from the outer surface, wherein the at least one nozzle projection is oriented to extend towards a filleted region defined between the outer surface and the radial member.

8. The gas turbine engine in accordance with claim 4, wherein the nozzle portion is formed separately from and subsequently integrally formed with the housing.

9. The gas turbine engine in accordance with claim 4, wherein the nozzle portion extends between the first and third walls beyond the first and third planes.

10. The gas turbine engine in accordance with claim 4, wherein the nozzle portion extends between the second and third walls beyond the second and third planes.

11. The gas turbine engine in accordance with claim 4, wherein at least one nozzle projection has a thickness such that a length-to-diameter ratio of plurality of impingement openings is greater than 1:1.

12. A method of manufacturing a manifold for use in a clearance control system, the method comprising:
    providing a housing that includes a plurality of walls, wherein the plurality of walls include a first wall having a first surface defining a first plane and a second wall having a second surface defining a second plane, the first and second walls extending substantially parallel with each other, and a third wall having a third surface defining a third plane, the third wall interconnecting and extending substantially perpendicular to the first and second walls, wherein the first, second, and third walls at least partially define an interior of the housing, a portion of the interior being disposed between the first and second walls; and
    integrally forming a nozzle portion with the housing, wherein the nozzle portion extends between the third wall and one of the first and second walls and includes at least one nozzle projection having a plurality of impingement openings defined therethrough, the at least one nozzle projection extending from the third wall and one of first and second walls in an outward direction relative to the interior of the housing and beyond the third plane and at least one of the first and second planes.

13. The method in accordance with claim 12 further comprising removing portions of the adjacent walls prior to integrally forming the nozzle portion with the housing.

14. The method in accordance with claim 12 further comprising:
    defining a plurality of openings in at least one wall in the plurality of walls; and
    orienting the nozzle portion relative to the housing such that the plurality of impingement openings and the plurality of openings in the at least one wall substantially align.

15. The method in accordance with claim 12 further comprising forming the nozzle portion using an additive manufacturing technique.

16. The method in accordance with claim 12, wherein integrally forming a nozzle portion with the housing comprises at least one of casting the nozzle portion and the housing, brazing the nozzle portion to the housing, or welding the nozzle portion to the housing.

\* \* \* \* \*